United States Patent [19]

Stewart et al.

[11] Patent Number: 5,336,015
[45] Date of Patent: Aug. 9, 1994

[54] SELF CENTERING ELECTRODE JOINT

[75] Inventors: James R. Stewart; James A. Klotz, both of Columbia, Tenn.; Crescenzo F. Fulgenzi, Rocky River, Ohio; Philip D. Coleman, Franklin, Tenn.

[73] Assignee: Ucar Carbon Technology Corporation, Danbury, Conn.

[21] Appl. No.: 981,606

[22] Filed: Nov. 25, 1992

[51] Int. Cl.$^5$ .......................... H05B 7/14; F16B 12/36
[52] U.S. Cl. ........................ 403/296; 403/DIG. 5; 314/60; 373/82; 373/91; 411/412
[58] Field of Search ................. 403/296, DIG. 5; 314/60; 373/91, 82; 411/412, 311, 310, 309

[56] References Cited

U.S. PATENT DOCUMENTS

| | | | |
|---|---|---|---|
| 1,049,624 | 1/1913 | Viertel | 403/296 |
| 2,970,854 | 2/1961 | Johnson | 403/DIG. 5 X |
| 3,134,616 | 5/1964 | Kaufmann | 403/DIG. 5 X |
| 3,176,746 | 4/1965 | Walton | 411/311 X |
| 4,152,533 | 5/1979 | Gazda | . |
| 4,375,340 | 3/1983 | Faircloth, Jr. | 403/296 |
| 4,439,077 | 3/1984 | Godsted | 411/412 X |
| 4,576,534 | 3/1986 | Barth et al. | 411/412 |
| 5,190,426 | 3/1993 | Wieder et al. | 411/412 |

FOREIGN PATENT DOCUMENTS

| | | | |
|---|---|---|---|
| 233119 | 3/1961 | Australia | 411/309 |
| 2514086 | 4/1983 | France | 411/412 |

*Primary Examiner*—Randolph A. Reese
*Assistant Examiner*—Christopher J. Novosad
*Attorney, Agent, or Firm*—F. J. McCarthy

[57] ABSTRACT

Threaded nipple for joining two electrode sections is provided with an integral ridge intermediate its threads for centering the electrodes in coaxial alignment.

8 Claims, 8 Drawing Sheets

Abraded Carbon (Graphite)

SELF CENTERING ELECTRODE JOINT

FIELD OF THE INVENTION

This invention relates to a threaded nipple for connecting together sections of carbon (including graphite) electrodes to provide a longitudinally extending electrode column for use in an electric arc furnace or the like. More particularly, the present invention is directed to a threaded nipple for connecting axially aligned electrode sections and establishing and maintaining coaxial alignment therebetween.

BACKGROUND OF THE INVENTION

With conventional carbon electrodes (including also graphite electrodes) a pair of longitudinally extending electrode sections are coupled by means of a threaded carbon (or graphite) nipple which is threaded into correspondingly threaded opposed sockets of the electrode sections, with the result that the respective opposing butt faces of the electrode sections are brought into abutting contact. As an electrode section is consumed in the course of furnace operation, a new electrode section is tandemly coupled in the same manner so that furnace operation can proceed continuously. That is, the lower end of the column is consumed in the furnace, the entire column is lowered to maintain the operation. Electrode sections are joined to the top of the column to replenish the consumed columns. However, there is occasional mechanical failure, i.e. breakage of a threaded nipple joint which requires the interruption of electric furnace operation.

U.S. Pat. No. 4,152,533 is directed to nipple joint breakage and addresses the problem of stresses at the first few bottom threads of an electrode socket, by chamfering these threads. U.S. Pat. No. 4,375,340 addresses the problem of stresses at or near the mid-length of a threaded nipple which are relieved to increase the strength of the joint. These prior art techniques do not, however, eliminate joint failures due to electrode nipple misalignment and this has remained a serious industrial concern.

SUMMARY OF THE INVENTION

It has been found, as part of the present invention, that threaded nipple joint failures commonly occur when the coupled electrode sections and/or nipple are not in substantially complete coaxial alignment. Examination of a number of failed threaded nipple joints has shown that the respective longitudinal axes of the coupled electrode sections were significantly off-set and the nipple tilted at an angle, and not coincident, which condition often led to the joint failures.

It is therefore an object of the present invention to provide a means for ensuring coaxial longitudinal alignment of the nipple and electrode sections in order to avoid electrode joint failure.

Other objects will be apparent from the following description and claims taken in conjunction with the drawings.

DETAILED DESCRIPTION OF THE DRAWINGS

Figure 1:
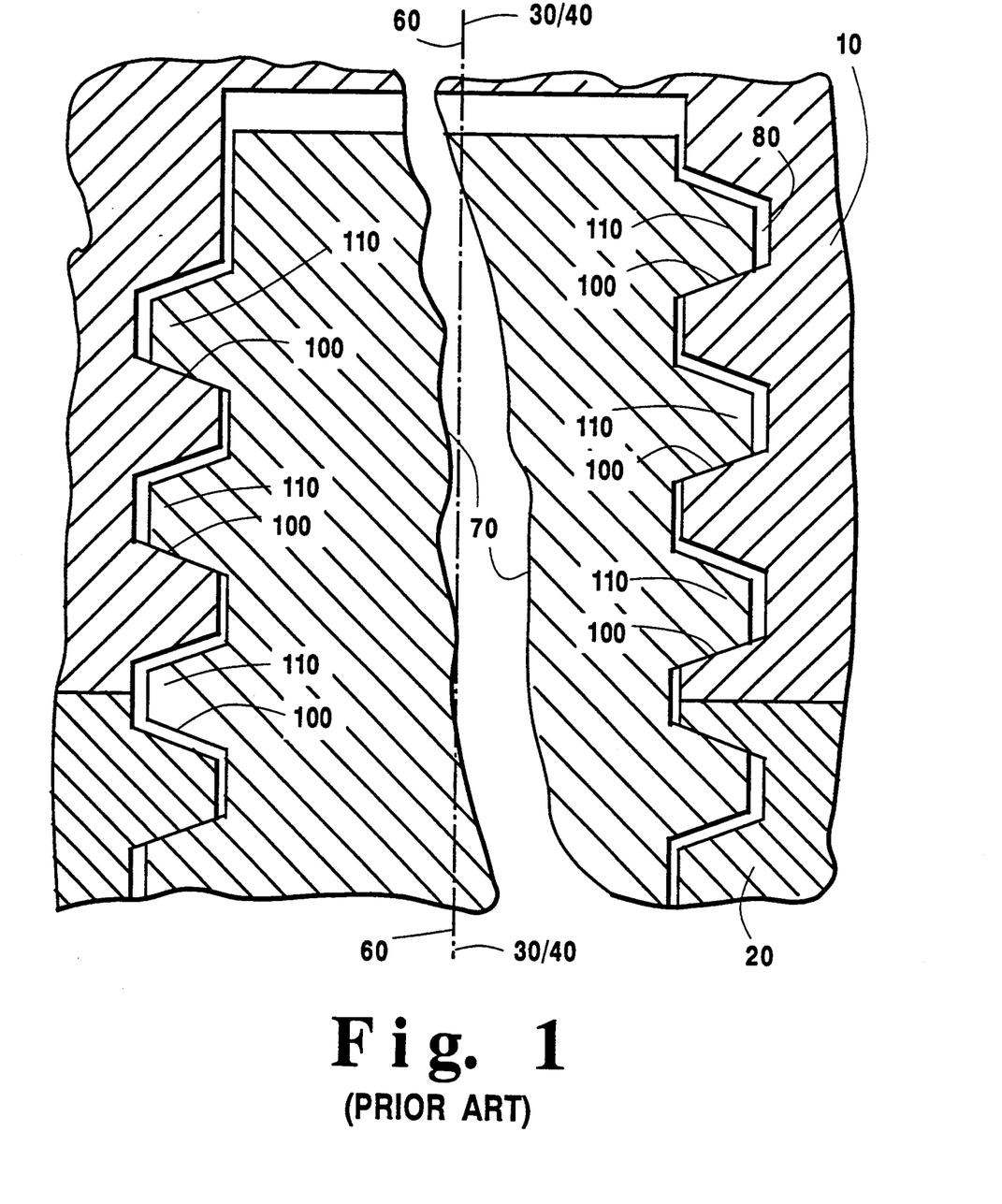
FIG. 1 shows an elevation view in section of a conventional electrode joint.
Figure 1A:
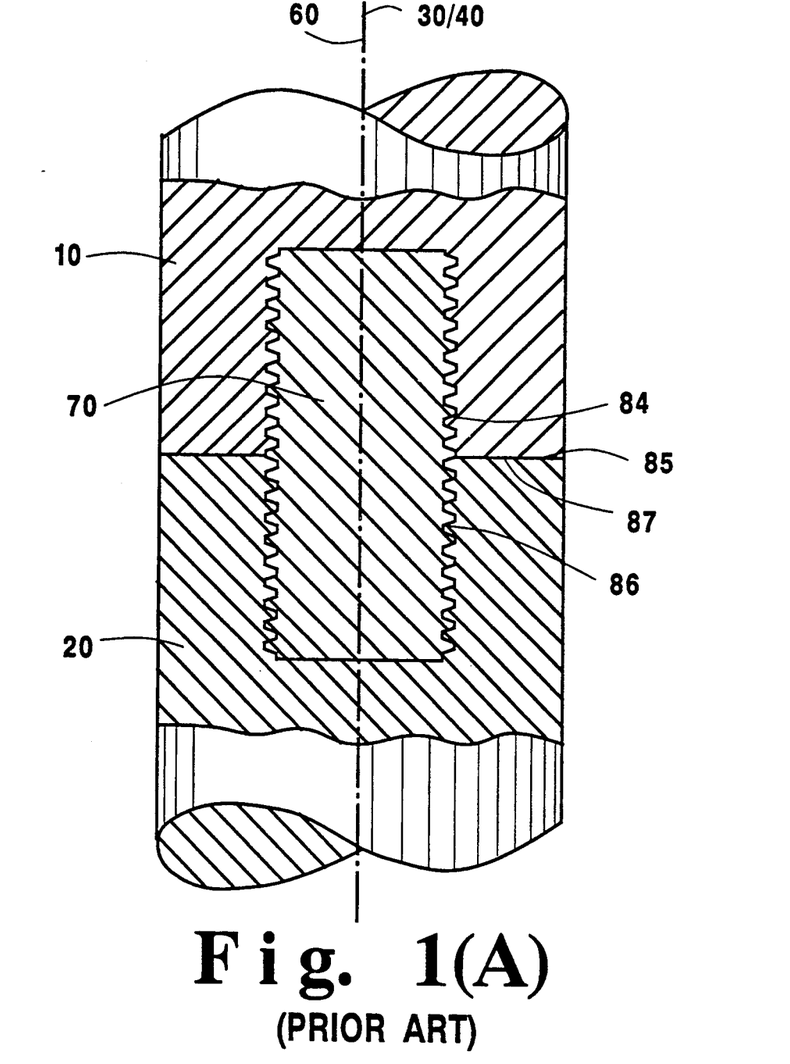
FIG. 1(A) and 1(B) show elevation views, partly in section, of different threaded nipple joint configurations of the prior art.
Figure 1B:
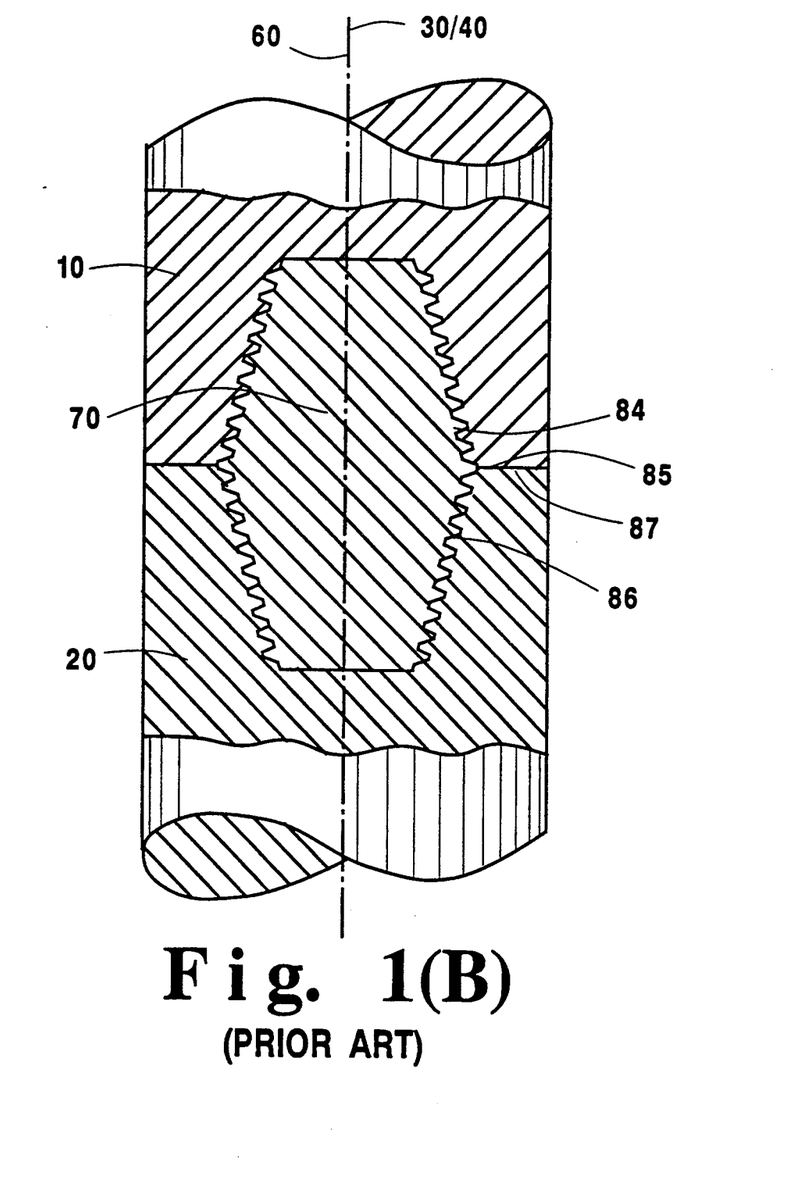
Figure 2:
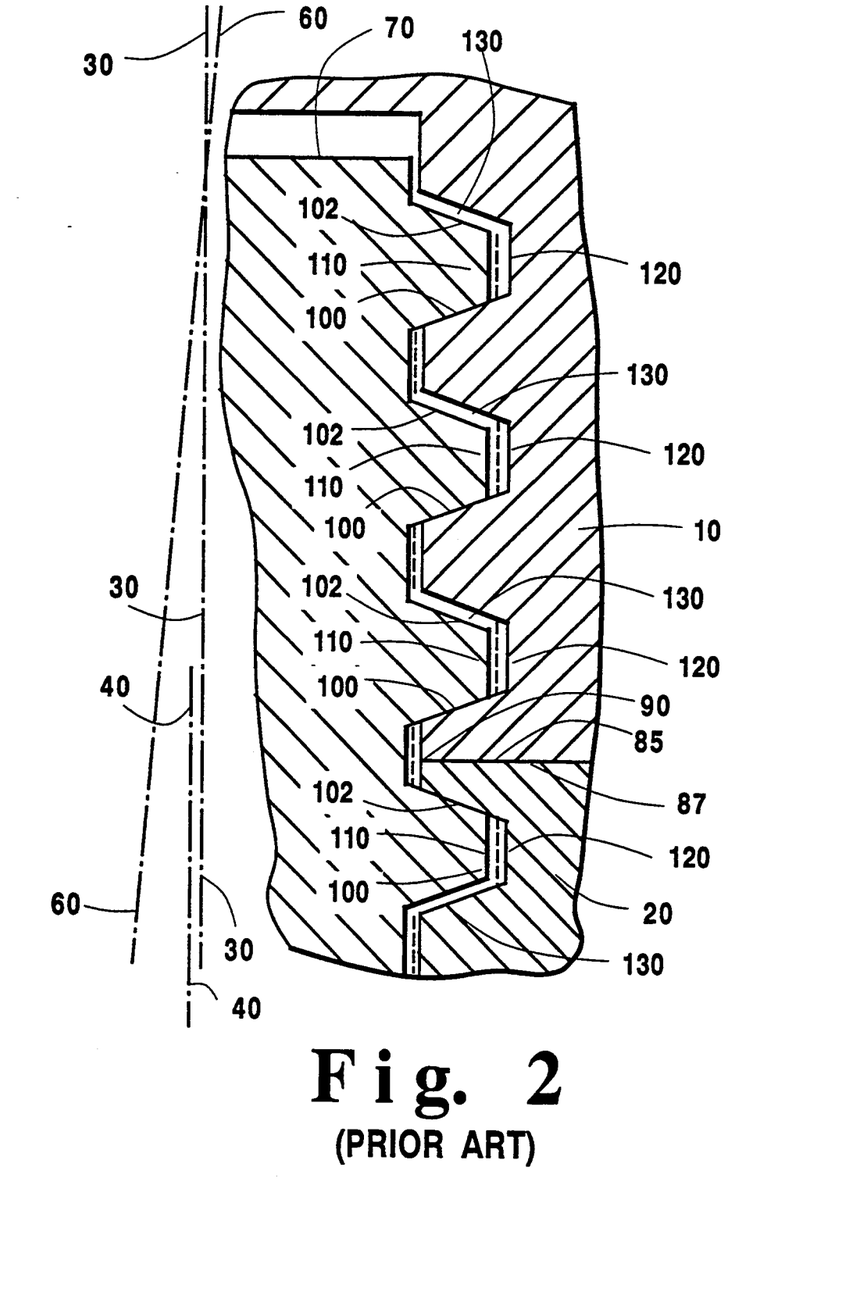
FIG. 2 is a partial elevation view which illustrates a misaligned electrode joint configuration.
Figure 3:
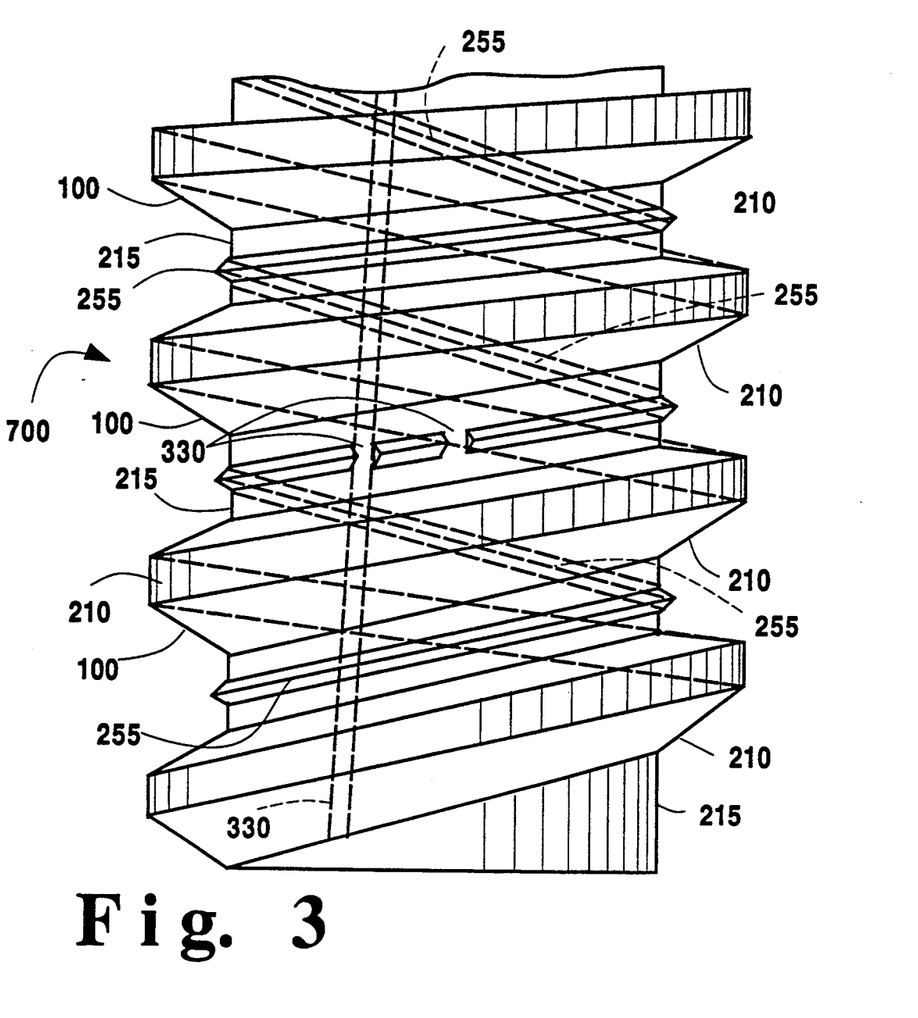
FIG. 3 shows a partial elevation view of a threaded nipple in a accordance with the present invention.
Figure 3A:
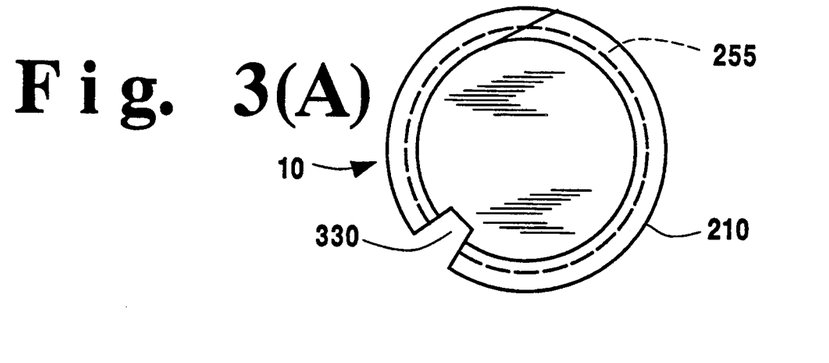
FIG. 3(A) is a top plan view of the device of FIG. 3.
Figure 4:
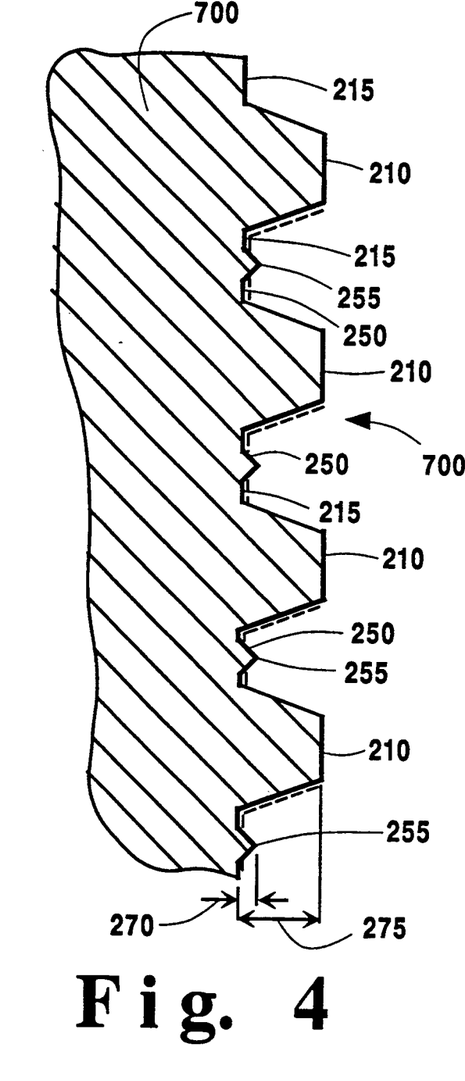
FIG. 4 is a sectional elevation view of the device of FIG. 3.
Figures 4A, 4B:
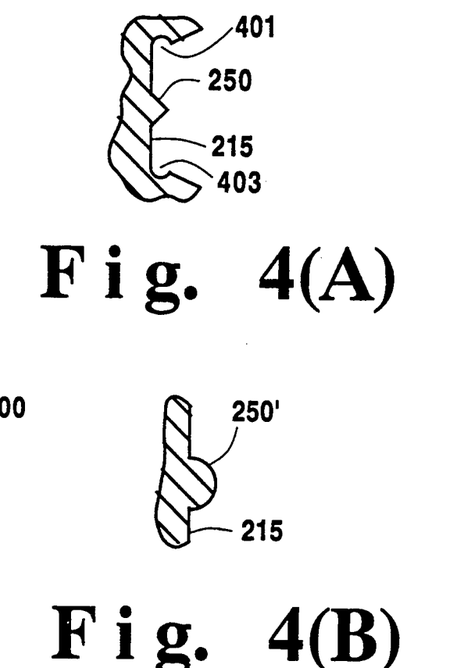
FIGS. 4(A)–4(C) show alternate configurations for the device shown in FIG. 4.
Figure 5:
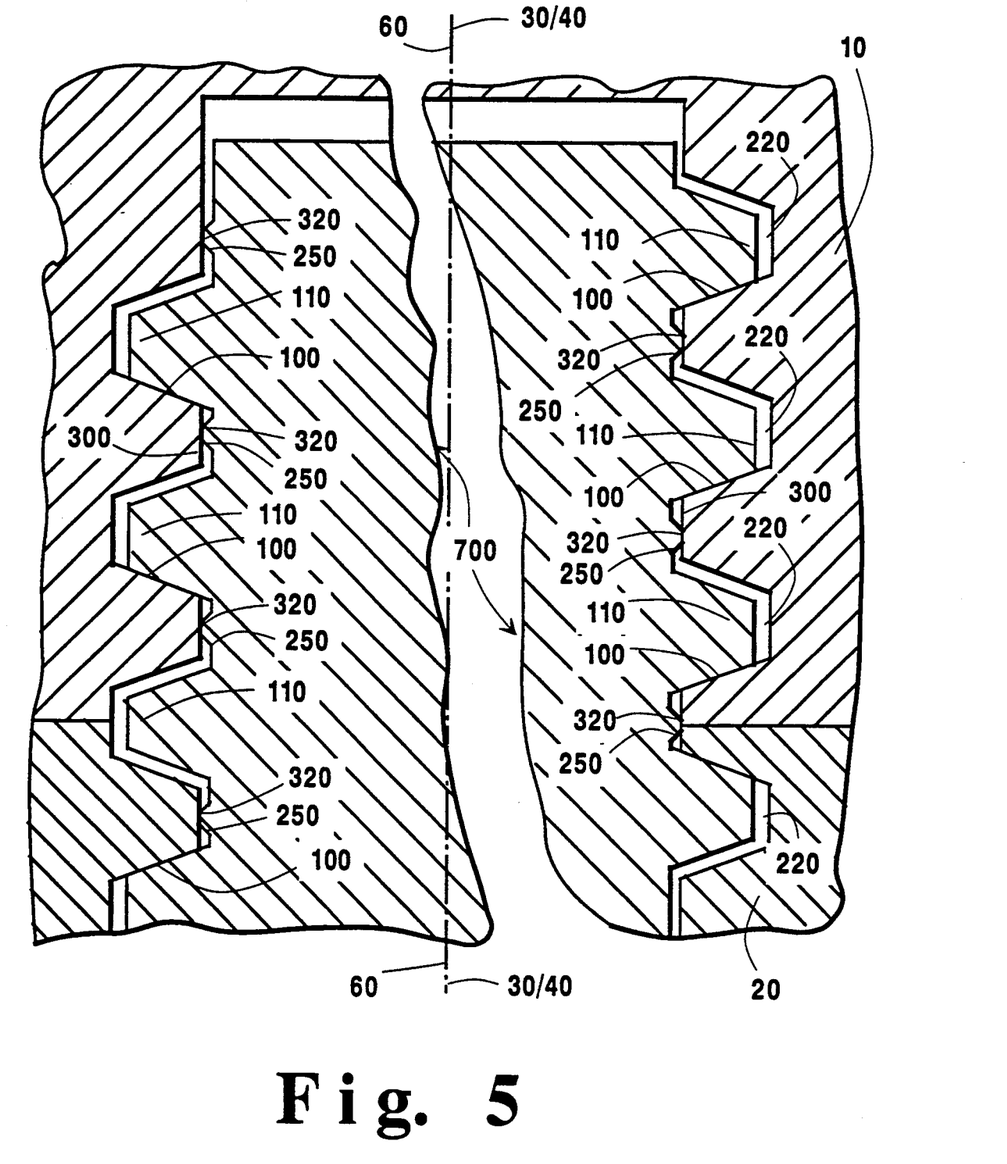
FIG. 5 is a sectional elevation view of the device of FIG. 3 after engagement with a pair of opposed coaxial electrode sections.
Figure 6:
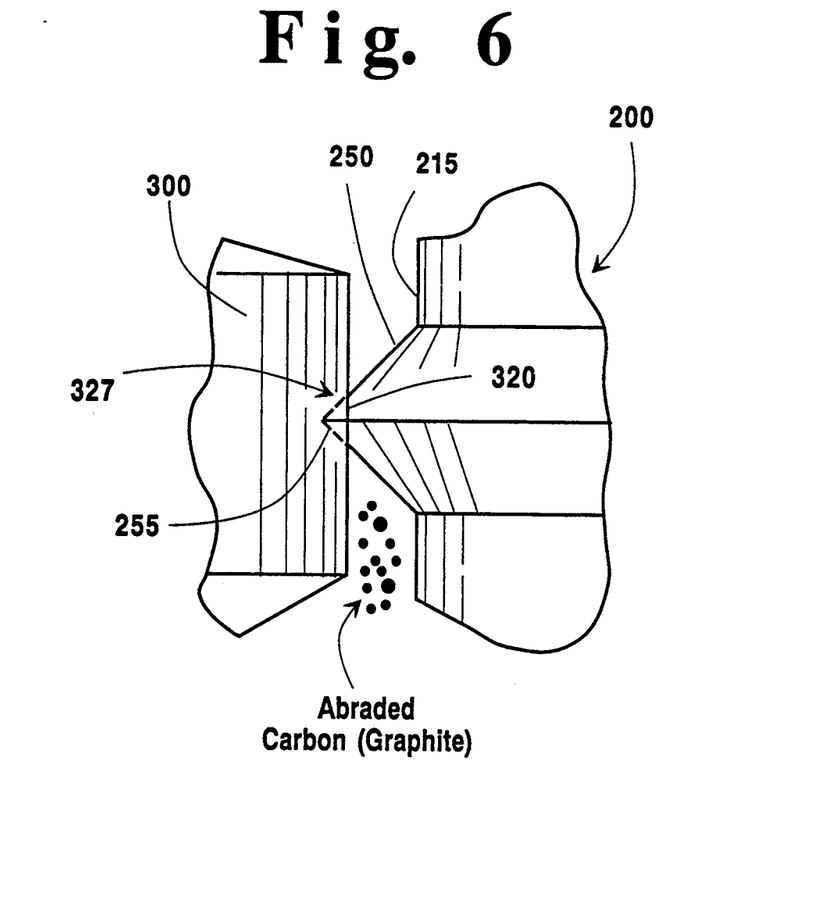
FIG. 6 is a partial elevation view showing with more particularity the engagement of the device of FIG. 3.

FIG. 1 shows a conventional electrode joint arrangement for coupling the electrode sections 10 and 20, which is shown also in FIG. 1(A). The electrode sections 10, 20 are desirably coaxially aligned to avoid mechanical stress with their longitudinal axes 30, 40 coincident as shown in FIG. 1 and FIG. 1(A), and also coincident with the central longitudinal axis 60 of cylinder-shaped threaded nipple 70 as shown. An alternate conventional joint arrangement is shown in FIG. 1(B) wherein the threaded nipple 70 is double tapered. Due to required machining tolerance in the threaded sockets 84, 86, indicated at spaces 80, it can happen that the threaded nipple 70 is tilted in the course of threadably engaging the electrode sections 10, 20 as schematically shown in FIG. 2, so that the opposing butt faces 85, 87 of electrode sections 10, 20 are displaced, as shown at 90 in FIG. 2, and the longitudinal axis 60 of threaded nipple 70 is tilted with respect to the axes 30, 40 of the electrode sections 10, 20. Under these circumstances the load-bearing flanks 100 of threads 110 of threaded nipple 70 are displaced in grooves 120, 120 of the sockets in electrode sections 10, 20 and the spaces 130–130 ″″ adjacent idle flanks 102 are non-uniform, i.e. the spaces increase from 130 to 130″″. The misalignment conditions shown in FIG. 2 have been found to contribute to the stresses which result in electrode joint mechanical failure, i.e. breakage. A threaded nipple in accordance with the present invention for maintaining coaxial alignment and avoiding joint breakage and failure is shown at 700 in FIG. 3, and in section in FIG. 4, in which the threaded nipple 700 is provided with spaced apart integral threads 210 on root 215 which, when in use, threadably engage grooves 220, 222 of electrode sections 10, 20 as shown in FIG. 5. A ridge 250 is provided integral with root 215 and located adjacently intermediate threads 210 to extend outwardly from root 215, but to a substantially less extent than threads 210. Instead of a cylindrical shape as shown in FIG. 3, 4, 5, the threaded nipple in accordance with the present invention can have the double-taper shape of FIG. 1(B). The outward extension 270 of ridge 250, shown in FIG. 4, is suitably from 5 to 20% of the outward extension 275 of thread 210, also illustrated in FIG. 4. Ridge 250 is preferably provided with a substantially pointed edge 255 so that upon engagement of threaded nipple 700 in a correspondingly threaded electrode section 10, 20, the recessed ridge 250 abradably bears against the flat surfaced crests 300, 302 in the sockets of electrode sections 10, 20, which separate the grooves 220, 222. This effect is shown in the partial view of FIG. 6 wherein the outer edge 255 of ridge 250 is abradably worn away to leave flat surfaces 320 on ridge 250 which hold the threaded nipple in coaxial alignment with electrode sections 10, 20 as shown in FIG. 5 and the development of destructive stresses due to misalignment of coupled electrode sections is avoided. Ridge 250 is preferably angular and pointed as shown at 255 in FIG. 3 to facilitate abrasion to a flat supporting surface after abrasion. The ridge 250 is preferably positioned slightly closer to the adjacent load bearing flank 100 of threaded nipple 700, so that, with reference to FIG. 7, the distance A is about 5 to 20% longer than distance B. This enables the edge 255 to bearingly engage the center of flat surfaced socket crests 300 throughout the threading of nipple 700 into electrode sections 10, 20. This off-center arrangement takes into account the space adjacent above idle flanks 130 which necessarily occurs due to machining tolerances.

Figure 4C:
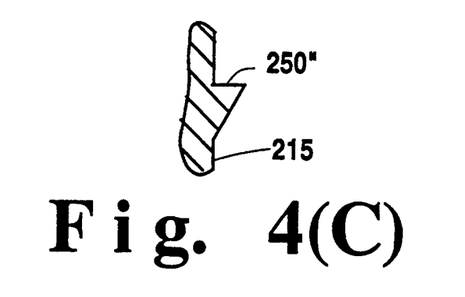
Figure 7:
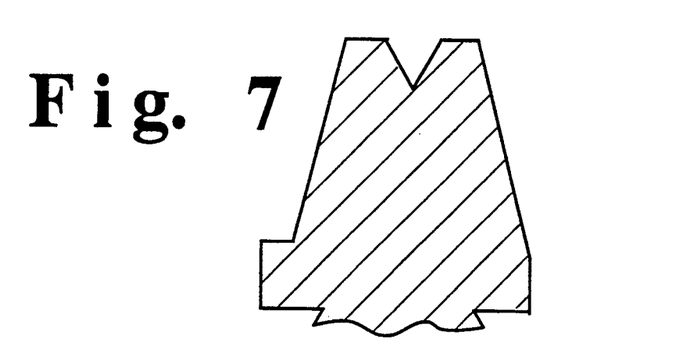
FIG. 7 shows a tool for use in the manufacture of the device of FIG. 3.

FIG. 7 shows, in section a threading tool having a notch N for creating a ridge 250 in the course of creating the threads 210 of FIG. 3. Exemplary tool dimensions are shown in the legend for FIG. 7. It is preferred that the ridge 250 be in the form of a continuous helix integral with the carbon (or graphite) root 215 and substantially coextensive with threads 210. However, the ridge 250 can be discontinuous, by the incorporation of a plurality of spaced apart slots, such as shown exemplarily at 330 in FIG. 3. Such slots should in the aggregate, constitute less than one quarter of the total length of ridge 250. The slots 330 can provide a relief passage for carbon particles resulting from abrasion. In operation, the threaded nipple 700, shown in FIG. 3, is initially engaged to an electrode section, and ridge 250, gradually and continuously bears against the flat surfaced crests of the socket of an electrode section and is gradually abraded as illustrated at 327 in FIG. 6 so as to, in effect, coaxially wedge the nipple 700 in the socket as shown in FIG. 5. Gutters 401,403 in root 215, which can be coextensive with ridge 250 may be optionally provided, as shown in FIG. 4(c), to receive abraded particles.

What is claimed is:

1. As an article of manufacture, a threaded carbon nipple for joining a pair of opposed carbon electrode sections each having respective opposed threaded sockets, each said threaded socket having threaded grooves separated by substantially flat surfaced crests, said threaded carbon nipple comprising
   (i) a longitudinally extending root portion;
   (ii) spaced apart threads on said root portion extending outward therefrom and integral therewith for threadably engaging threaded grooves of an electrode section;
   (iii) an abradable ridge on said root portion integral therewith located adjacently intermediate said spaced apart threads on said root portion and extending outward from said root portion but to a substantially less extent than said spaced apart threads so that upon threadable engagement of said threaded carbon nipple with an electrode section said ridge is abradably worn away to leave a flat surface which bears against the flat surfaced crests of the threaded socket which separate the grooves of said electrode section socket.

2. An article in accordance with claim 1 wherein said ridge is substantially continuous and coextensive with said threads on said root.

3. An article in accordance with claim 1 wherein said ridge is spaced away from adjacent threads on said root.

4. An article in accordance with claim 3 wherein said ridge is slightly closer to one adjacent thread so that it will abradably bear against the central portion of a flat surfaced crest of the socket of an electrode section.

5. An article in accordance with claim 4 wherein a plurality of slots are provided in said ridge.

6. A carbon electrode joint comprising a pair of opposed abutting carbon electrode sections each section having respective opposed threaded sockets, with each said threaded socket having threaded grooves separated by substantially flat surfaced crests and a threaded carbon nipple having:
   (i) a longitudinally extending root portion;
   (ii) spaced apart threads on said root portion extending outward therefrom and integral therewith threadably engaging threaded grooves of both electrode sections;
   (iii) an abradable ridge on said root portion integral therewith located adjacently intermediate said spaced apart threads on said root portion and extending outward from said root portion but to a substantially less extent than said spaced apart threads so that upon threadable engagement of said threaded carbon nipple with a carbon electrode section, said ridge is abradably worn away and bears against the flat surfaced crests of the threaded socket which separate the grooves of said electrode section socket to provide a flat surface on said ridge which bears against the flat surfaced socket crests.

7. As an article of manufacture, a threaded carbon nipple for joining a pair of opposed carbon electrode sections each having respective opposed threaded sockets, each said threaded socket having threaded grooves separated by substantially flat surfaced crests, said threaded carbon nipple comprising
   (i) a longitudinally extending root portion;
   (ii) spaced apart threads on said root portion extending outward therefrom and integral therewith for threadably engaging threaded grooves of an electrode section;
   (iii) an abradable ridge on said root portion integral therewith located adjacently intermediate said spaced apart threads on said root portion and spaced away from adjacent threads on said root and extending outward from said root portion but to a substantially less extent than said spaced apart threads so that upon threadable engagement of said threaded carbon nipple with an electrode section said ridge is abradably worn away to leave a flat surface which bears against the flat surfaced crests of the threaded socket which separate the grooves of said electrode section socket said ridge is being slightly closer to one adjacent thread so that it will abradably bear against the central portion of a flat surfaced crest of the socket of an electrode section.

8. An article in accordance with claim 7 wherein a plurality of slots are provided in said ridge.